United States Patent
Salamat

(10) Patent No.: US 7,120,149 B2
(45) Date of Patent: Oct. 10, 2006

(54) METHODS AND SYSTEM FOR RESEQUENCING OUT OF ORDER DATA PACKETS

(75) Inventor: Bahman Salamat, North Potomac, MD (US)

(73) Assignee: Ericsson Inc., Plano, TX (US)

( * ) Notice: Subject to any disclaimer, the term of this patent is extended or adjusted under 35 U.S.C. 154(b) by 1152 days.

(21) Appl. No.: 10/028,163

(22) Filed: Dec. 19, 2001

(65) Prior Publication Data

US 2003/0012200 A1 Jan. 16, 2003

Related U.S. Application Data

(60) Provisional application No. 60/272,267, filed on Feb. 28, 2001.

(51) Int. Cl.
*A04L 12/28* (2006.01)
(52) U.S. Cl. ...................... 370/394; 370/474
(58) Field of Classification Search ............. 370/394, 370/389, 400, 401, 474, 392
See application file for complete search history.

(56) References Cited

U.S. PATENT DOCUMENTS

| | | | |
|---|---|---|---|
| 4,752,836 A * | 6/1988 | Blanton et al. | 386/84 |
| 5,410,536 A * | 4/1995 | Shah et al. | 370/216 |
| 6,342,904 B1 * | 1/2002 | Vasudevan et al. | 715/723 |
| 6,438,108 B1 * | 8/2002 | Kanljung et al. | 370/249 |
| 6,463,307 B1 * | 10/2002 | Larsson et al. | 455/574 |
| 6,671,288 B1 * | 12/2003 | Onodera et al. | 370/469 |

* cited by examiner

*Primary Examiner*—Ajit Patel
(74) *Attorney, Agent, or Firm*—Roger Burleigh

(57) ABSTRACT

Methods and a related data routing system for handling received data packets that are out of sequence and were previously declared lost. Following receipt of a data packet, it is determined if the sequence number of the received data packet is out of order in comparison to previously received data packets. If the sequence number is out of order, the distance between the out of order sequence number and the sequence number of the last data packet that was received in sequence is calculated. The distance is used to discard or keep the received data packet based on a predetermined amount of threshold level of distance, the threshold level of distance being a function of the finite amount of memory space of the data transmission device.

23 Claims, 3 Drawing Sheets

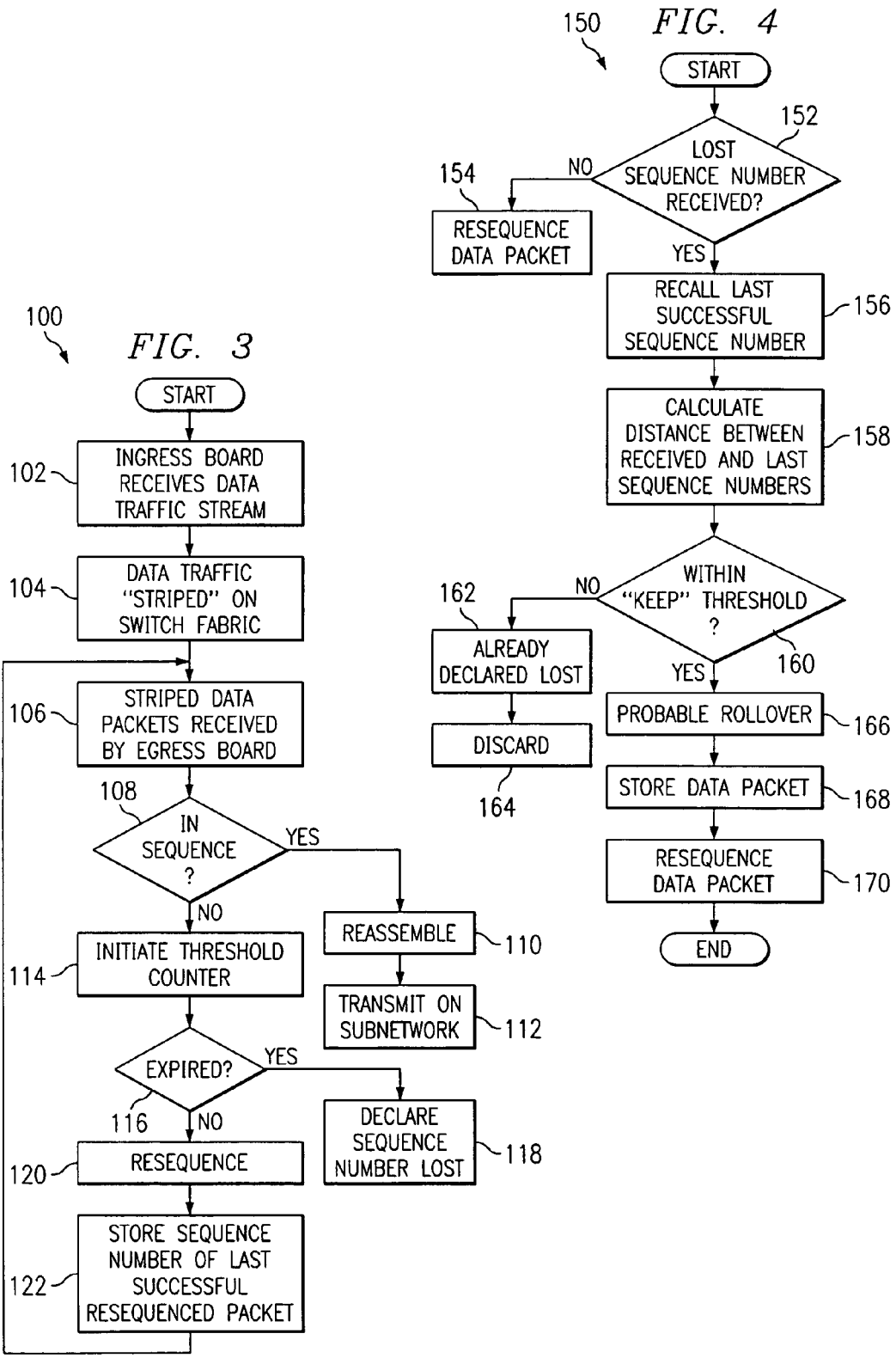

METHODS AND SYSTEM FOR RESEQUENCING OUT OF ORDER DATA PACKETS

CROSS REFERENCE TO RELATED APPLICATIONS

This application is related to Provisional Application Ser. No. 60/272,267 entitled "Re-sequencing methods for data packets," by Bahman Salamat, filed Feb. 28, 2001, the entirety of which is incorporated herein by reference. This application claims priority on the aforementioned related provisional application.

TECHNICAL FIELD

The present invention relates in general to data networks and more particularly to communicating packet data between an originating point and a destination point in a data network. More particularly, the present invention relates to methods of reliable transmission and reception of data packets utilizing efficient method of resequencing out of order data packets to minimize router complexity and memory space requirements. Still more particularly, the invention provides a way of resequencing a data packet whose sequence number was previously declared lost and which is subsequently received by the routing device.

BACKGROUND OF THE INVENTION

Without limiting the scope of the invention, its background is described in connection with modern day high speed data networks utilized as a transport mechanism for packetized data.

In a packet-switched network, data is transmitted in a series of packets as opposed to complete segments of data. Generally, packets are assembled according to standardized transmission protocols and include the origination/destination information in a packet header. Transmission links may be high speed optical fibers, copper wiring, wireless, and/or other communication medium with switching elements at each node forming the end-to-end communications pathways between the nodes such that a virtual pathway is defined between points of origination and points of destination in the network.

When a packet is received at one node, its header information is inspected by a routing system (or "router") at the node, and delivered to an appropriate switching element based on its destination. Typically, routers cause the data to be switched unto a fabric of interconnections or pathways comprising the "switch fabric" that couples the input or "ingress" side of the router, to the output or "egress" side.

Within the interconnection network, packet data is often associated with a sequence number indicating the order in which it has been sent by the ingress board through multiple paths of the switch fabric before reaching the egress side of the router. In this way, the data is "striped" such that not all data packets are transmitted on the same signal pathway. Striping enables the distribution of data over the switch fabric and increases efficiency and utilization of network resources. Thus, packets communicated between an ingress port and egress port are striped in order to make internal routing through the switch fabric as efficient as possible.

When a stream of packets is transmitted from an ingress port to an egress port, due to the number of different switch fabric paths and other factors such as unexpected delay or equipment failure, the transmitted packets may arrive out of sequence at the egress port side. There are already a number of conventional mechanisms for resequencing the out of sequence packets at the egress port side. One such mechanism is using a buffer or other memory configuration of a limited size to hold all packets in the sequence space until they are properly sequenced. For example, holding packets numbers 4, 5, 6, and all packets up to n, where n is the largest number in the sequence space, until packet number 3 is received and then transmitting packets 3–n. However, such resequencing methods consume precious memory space and increase the complexity and cost of the routing device.

Due to a number of factors, a packet could be lost within the switch fabric and the egress port may be forced to mark a packet as lost and discard the packet. Once a particular data packet has been declared lost, however, if a sequence number arrives at the egress side that is associated with that lost data packet, a problem arises on how to deal with the lost data packet that in actuality was severely delayed in reaching the egress. The delayed data packet must be discarded but not a packet that has a sequence number identical to the delayed packet.

What is needed is a means of handling out of sequence data packets. A method of handling packets which are received but which were previously declared lost would provide numerous advantages.

SUMMARY OF THE INVENTION

The present invention provides a method and system for receiving and resequencing out-of-order data packets that permits the use of reduced memory architectures within a router. The invention utilizes methods of bit storage and comparison against threshold levels of sequence numbers associated with packets already received and successfully sequenced. By focusing on a smaller range of sequence numbers up to a predetermined threshold, the memory space required to store a sequence and compare it against incoming data packets is drastically reduced.

Therefore, disclosed in one embodiment, is a method of handling data packets whose sequence number are out of order with respect to previously received data packets. Following receipt of a data packet, the method comprises the step of determining if the sequence number of the received data packet is out of order in comparison to previously received data packets. Next, if the sequence number is out of order, the method determines the distance between the out of order sequence number and the sequence number of the last data packet that was received in sequence. The method further comprises the step of using the distance to discard or keep the received data packet based on a predetermined amount of threshold level of distance, the threshold level of distance being a function of the amount of sequence space available in the data transmission device.

According to a second embodiment, in a system for routing packet data, the system including an ingress side, an egress side, and switch fabric providing pathways between the ingress side and egress side, disclosed is a method of handling data packets received at the egress side of the system that appear to have been previously designated as lost. The method comprises the steps of the egress side of the system receiving an out of sequence data packet. Next, a resequencing engine of the system measures the distance between the sequence number associated with the out of sequence data packet and the sequence number of the last packet that was received in sequence. The resequencing engine discards or resequences the received data packet based on a predetermined threshold level of distance, the threshold level of distance being a function of the amount of memory in the system that is available for resequencing data packets.

Further disclosed is a data routing system that is capable of handling received data packets that appear to have been marked as lost. The data routing system comprises an ingress side for receiving incoming data packets from a data network and an egress side for transmitting outgoing data packets unto the network. Switch fabric is interspersed between the ingress side and the egress side for routing data packets received from the ingress side to a destination serviced by the egress side. The system further comprises a resequencing engine with a processor and logic instructions for causing the processor to measure the distance between the sequence number associated with an out-of-sequence data packet received at the egress side and the sequence number of the last packet that was received in sequence. The resequencing engine is further adapted to discard or resequence a received data packet based on a predetermined threshold level of distance, the threshold level of distance being a function of the amount of memory in the system that is available for resequencing data packets.

The present invention offers definite advantages over conventional ways of packet resequencing. With the invention, the receipt of packets previously declared loss is handled efficiently with less sequence space requirements. Moreover, the methods and system of the present invention can be applied to data routing systems that handle multiple data streams wherein loss data packets can be detected from any stream and traditional resequencing would be prohibitive.

BRIEF DESCRIPTION OF THE DRAWINGS

The features of the present invention will be more clearly understood from consideration of the following descriptions in connection with accompanying drawings in which:

FIG. 3 is an exemplary process flow diagram illustrating the method of receiving a data packet in accordance with one embodiment of the present invention;

FIG. 4 is an exemplary process flow diagram illustrating the method of resequencing a data packet in accordance with the present invention;

Corresponding numerals and symbols in the various figures refer to corresponding parts unless otherwise indicated.

DETAILED DESCRIPTION OF PREFERRED EMBODIMENTS

Figure 1:
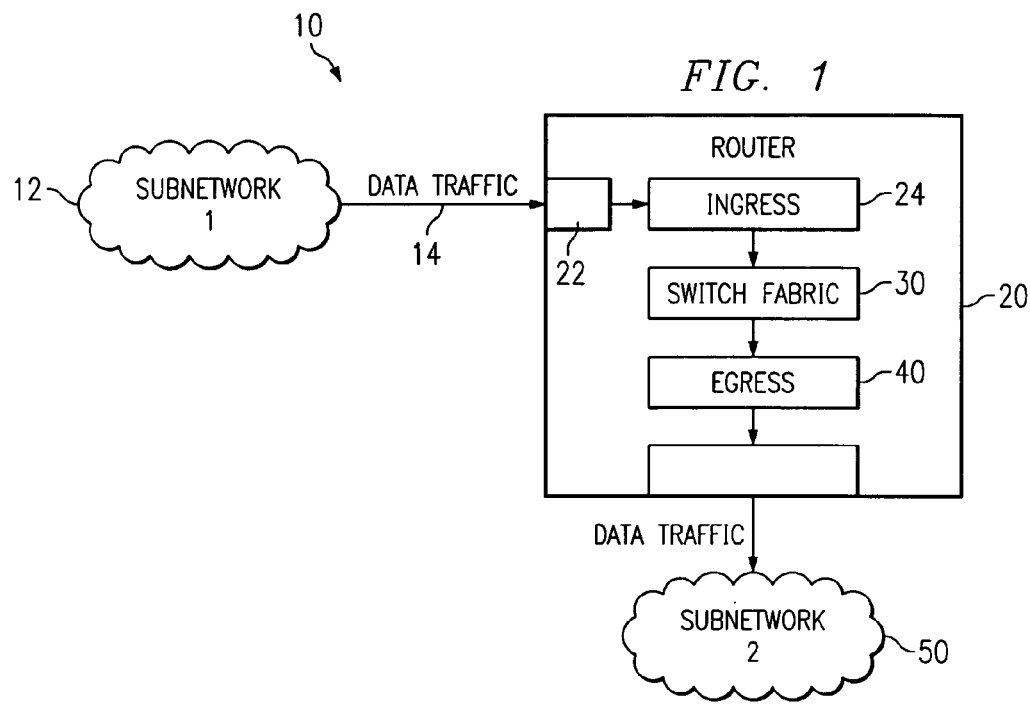
FIG. 1 is a system diagram of a data network including a router with ingress and egress sides.

With reference now to the figures and in particular to FIG. 1, therein is shown a general block diagram for a data network, denoted generally as 10, in which the present invention can be used. Data network 10 includes subnetwork 12 from which data traffic is transmitted on link 14 to router 20. The primary function of router 20 is to inspect the incoming data traffic received over link 14 and determine an appropriate destination based on the destination address included in the data traffic.

Router 20 is seen to include an input port 22 leading to an ingress board 24 which receives the incoming data traffic and transmits on switch fabric 30. Ingress board 24 is representative of a large array of equipment which is capable of receiving incoming data packets and directing it on to the appropriate switch fabric 30 where in reaches the transmitting side of the router 20 indicated by egress board 40. Thus traffic is sent from a receiving board, ingress 24, to the switch fabric 30 and arrives at the egress 40 where, if properly received, it is transmitted on to subnetwork 50. In this regard, the terms "ingress" and "ingress board," "egress" and "egress board" shall be used interchangeably throughout.

Figure 2:
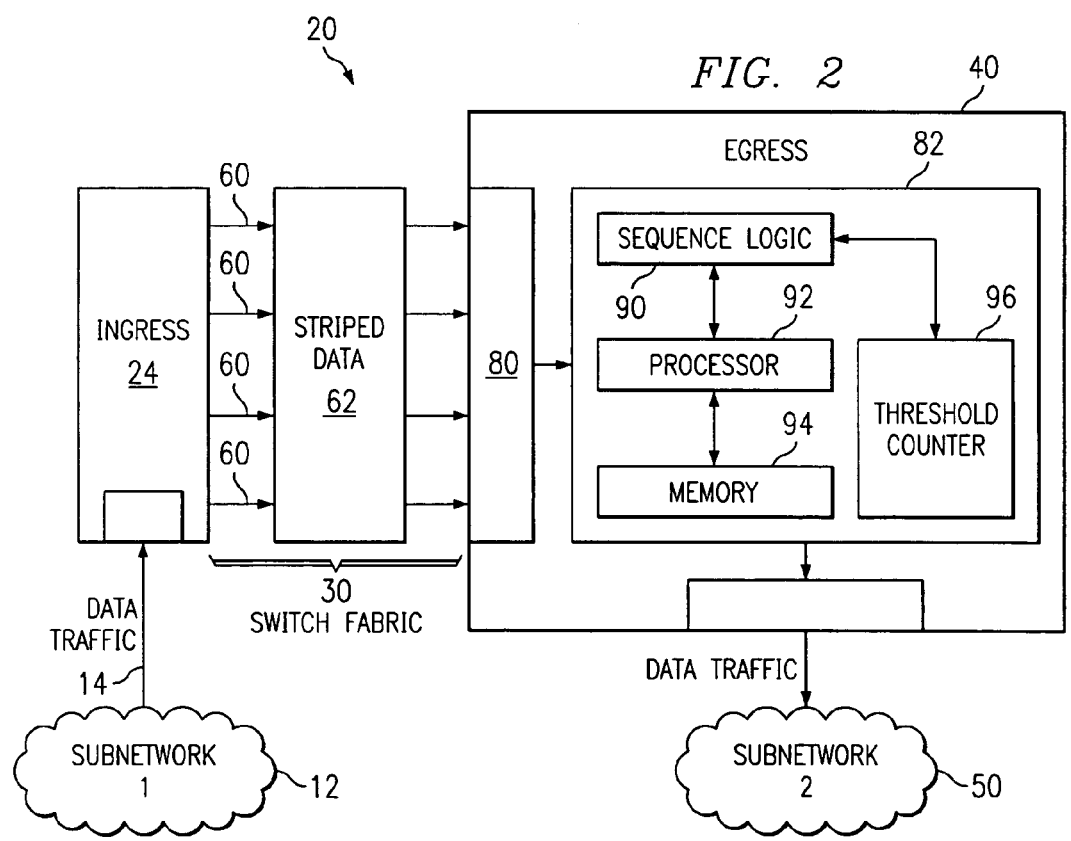
FIG. 2 is a detailed system diagram illustrating the striping of data and resequencing of data packets at the egress side of the router.

With reference now to FIG. 2, therein is shown a detailed diagram illustrating the flow of data traffic within the router 20. As shown, the data traffic is transmitted by the ingress 24 on multiple paths 60 which lead to egress ports 80. This method of transmitting data traffic is commonly known as "striping" the data in an effort to balance traffic through the router 20 and avoid congestion. Striping improves the distribution of data over the switch fabric 30 and increases efficiency and utilization of network resources. Eventually, the striped data 62 enters the egress ports 80 and are received by resequencing engine 82 at the egress board 40.

A problem associated with the transmission of striped data 62 on switch fabric 30 over multiple path 60 is the arrival of data packets out of sequence at the egress 40 of the router 20. More particularly, it has been observed that data packets can arrive out of sequence with respect to the order with which they were transmitted on the switch fabric 30 and no readily available means of dealing with out of sequence data packets has, until the present invention, been provided.

Accordingly, the present invention provides a method of handling data packets that are out of sequence with respect to the order in which they were transmitted. With further reference to FIG. 2, the resequencing engine 82 includes sequence logic 90 that operates a processor 92 capable of performing functions for implementing the resequencing algorithms of the present invention. The resequencing engine is seen to further include sequence space in the form of memory 94 which is allocated for storing sequence numbers of data packets received by the egress board 40. The methods of handling out of sequence data packets are discussed in further detail below, although it should be understood that the architecture of the system utilized and depicted in FIG. 2 is a general purpose in nature.

The invention provides methods for receiving and resequencing data traffic received at the transmitting side of a router, such as router 20. With reference now to FIG. 3, therein is shown a process flow diagram for a method of receiving data traffic at a router 20, according to the present invention. The method of the FIG. 3 is denoted generally as 100 and begins at 102 wherein the ingress board, such as ingress board 24, receives a data traffic stream. The ingress board inspects the data traffic stream and routes it on appropriate paths, such as paths 60, of the switch 30, as indicated at step 104. The data traffic is transmitted in striped format in order to balance use of data paths 60 forming the switch fabric 30. Next, the striped data packets are received by the egress board, step 106, and a determination is made if the data packets are in sequence at step 108. If so, process flow is directed to step 110 when the data packets are reassembled into the original data traffic stream received at the ingress board. The data packet stream is transmitted on a subnetwork, such as subnetwork 50, at step 112, leading to the intended destination of the data traffic stream.

Alternatively, if the data packets are not in sequence at step 108, process flow is directed to step 114, wherein resequencing engine 82 of the egress board 40 initiates a threshold counter 96. Threshold counter 96 can be implemented as any time keeping mechanism used by the resequencing engine 82 to maintain a time count of a predetermined amount of time in which an expected sequence number associated with an incoming data packet is to be received. The predetermined amount of time can be selected by the network operator and set specifically according to the constraints and limitations of the routing system and the amount of sequence space, such as memory 94, available for resequencing.

Next, in step 116, a determination is made if the threshold counter 96 has expired. If so, process flow is directed at step 118 wherein the next expected sequence number is declared lost. Conversely, if a sequence number is received within the time permitted by the threshold counter 96, process flow is directed to step 120 wherein the data packet is resequenced by the resequencing engine 82 of the egress board 40. Finally, the sequence number of the last successfully resequenced data packet is stored, step 122, in a sequence space such as memory 94. Process flow is then directed to step 106 wherein other data packets are received by the egress board in due course.

Thus the ingress board 24 assigns a sequence number to each data packet transmitted on the switch fabric 30. Sequence numbers are inspected by the egress board 40 upon receipt for each data packet and reassembled according to sequence number to assure it is properly constructed and transmitted on the network. The threshold counter 96 of the resequencing engine 82 maintains a time constraint in which an expected sequence number is to be received or declared lost by the resequencing engine 82.

Once a particular sequence number has been declared lost, if that sequence number arrives at the transmitting side of the router (egress bound 40), no readily available method of handling the data packet associated with the lost sequence number has, until the present invention, been provided. Moreover, since the sequence space, such as memory 94, is limited and since the egress board 40 may be handling multiple data streams from the switch fabric 30, it is practically impossible to indefinitely store all sequence numbers for all data streams with the available sequence space 94. Therefore, the present invention provides a method and system for handling data packets associated with sequence numbers that have previously been declared lost.

With reference to FIG. 4, therein is shown a exemplary process flow diagram for the method of handling data packets associated with lost sequence numbers according to the present invention. The method of FIG. 4, denoted generally as 150, begins at step 152, wherein the sequence number of the received data packet is inspected in order to determine if it has already been declared lost. Next, process flow is directed to step 154, wherein the data packet is resequenced using a standard resequencing methodology. If the packet data includes a lost sequence number, then the last successful sequence number is recalled, step 156, and the distance between the sequence number of the last data packet successfully resequenced and the sequence number associated with the recently received data packet is calculated as indicated at step 158.

The assertion is that on any given stream, the sequence number for the last packet successfully resequenced is stored. The sequence number can be stored, for example, in a sequence space, such as memory 94, of the resequencing engine 82, or any other suitable structure. If a new packet arrives whose sequence number has already been declared lost, by measuring the distance of the two sequence numbers, a good decision can be made about whether a packet has arrived late or the packet has arrived whose sequence number just coincidentally matches the loss packet sequence number. This way the system operator can define a threshold difference of distance that is appropriate for the amount of space allocated for sequencing. This threshold can be generally referred to as a keep threshold that is configurable by the system user and may be set correctly with some understanding of the system.

Therefore, at step 160, a determination is made between the sequence number of the recently received data packet and the sequence number of the last successfully sequenced data packet is within the keep threshold. If not, then it is safe to assume that the received data packet has a sequence number that has already been declared lost as indicated in step 162. In this instance, the received data packet is discarded, step 164.

Alternatively, if the distance between the sequence number of the recently received data packet and the sequence number of the last successfully sequenced data packet is within the keep threshold, then process flow is directed to step 166 wherein an assumption can be made that rollover has occurred, meaning that the sequence number only coincidentally matches the lost packet sequence number. In this instance, the egress board 40 would want to store the data packet, step 168, as it has not been previously discarded, and is a suitable candidate for further resequencing, step 170.

Thus the present invention provides a method of handling data packets whose sequence numbers have been previously declared lost for use in a data transmission device, such as It should be understood that resequencing engine 82 can perform operations on, for example, 64 distinct traffic streams. On any given stream, the sequence number for the last packet successfully resequenced is stored. Then if a new packet arrives whose sequence number has already been declared lost, by measuring the distance of the two sequence numbers (the packet that has been declared lost and the last arriving sequence number), a decision can be made about whether a packets has arrived very late or if a packet has arrived, whose sequence number matches the "lost" data packet's sequence number.

As indicated, the predetermined threshold is a measure of the distance between the last successfully sequenced data packet and an out of order data packet. As an example, if the last packet resequenced successfully was sequence number 1200 and then packet 400 arrives and a decision is made that the data packet with sequence number 400 has been lost. If sequence number memory space is, for example, 64 k then the distance is 800. This may be determined by the equations 1 and 2 below which are included to provide an example:

$$\text{Distance} = (\max\_sn - A\_sn + L\_sn) \qquad \text{Equ. 1}$$

where $(A\_sn \geq L\_sn)$ $$\text{Distance} = (L\_sn - A\_sn) \qquad \text{Equ. 2}$$

where $(A\_sn < L\_sn)$

Last resequenced data packet's sequence number=$L\_sn$

Arriving data packet's sequence number=$A\_sn$

Those of skill in the art will appreciate numerous ways of calculating the distance between the received sequence number and the last successful sequence number. The upper six bits, for example, of the sequence number may be used to determine the distance between the last resequenced data packet's sequence number and the arriving data packet's sequence number.

If the arriving data packet's sequence number (A_sn) is less than the last resequenced data packet's sequence number (L-sn), and if the value of 800 is less than a "keep" threshold, then the data packet is deemed to be very late (already declared lost). If the value 800 is larger than the "keep" threshold, then a rollover may have occurred. The "keep" threshold may be configurable. Another example may be if the arriving data packet's sequence number is greater than or equal to the last resequenced data packet's sequence number and a data packet with a sequence number 1600 arrives, then:

$$Distance=(64k-1600+1200)$$

In essence, the resequencing logic 90 is adapted for determining if an incoming data packet is out of order in comparison to previously received data packets and, if so, for storing a first portion of bits from a sequence number associated with the received data packet in the memory space 94. Thus, the egress board 40 receives an incoming data packet from at least one ingress board, such as ingress board 24, and resequences the received data packet so that it is placed in an order according to sequence number. The resequencing logic 90 causes processor 92 to compare a first portion of bits to a threshold value, the threshold value being a function of the distance between data packets previously received that were in sequence and an out of order data packet received by the egress board 40. After the data packets are resequenced by resequencing logic 90 and processor 92, the data packets are transmitted a subnetwork 50.

Figure 5:
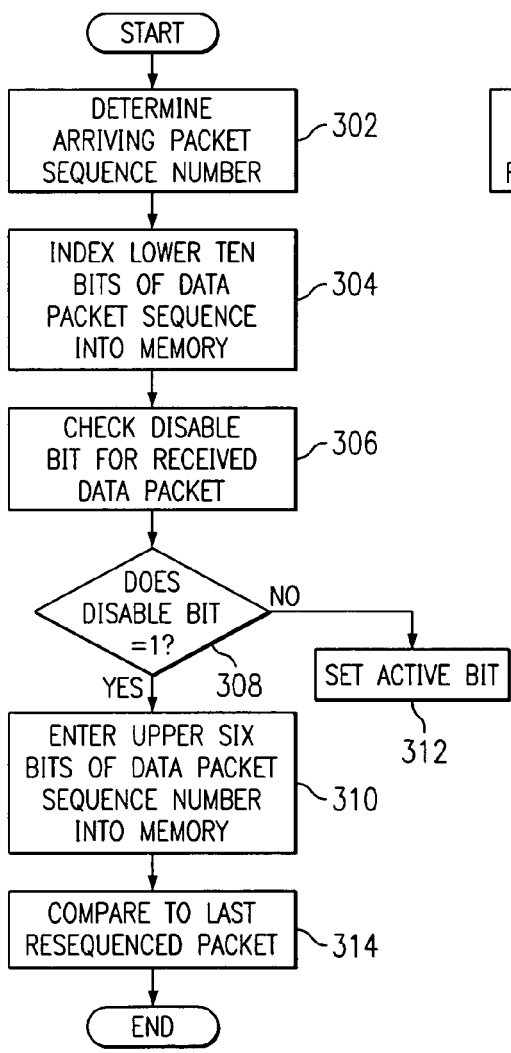
FIG. 5 is an exemplary process flow diagram illustrating in detail the method of data packet reception in accordance with the present invention.

FIG. 5 is a process flow diagram illustrating in detail a method of receiving a data packet in accordance with the present invention. In this example, the operation starts with determining the sequence number of an arriving data packet at step 302. Bits of the sequence number of the arriving data packet is then inserted into memory, step 304. The bits of the sequence number of the arriving data packet that is indexed into memory may be, for example, the lower ten bits of the sequence number. A disable bit associated with the arriving data packet is then examined, step 306. Then a determination is made as to whether or not the disable bit associated with the arriving data packet is equal to "1," step 308. If the disable bit associated with the arriving data packet is not equal to "1," step 308, an active bit of the data packet is set, step 312 and thereafter the operation terminates.

If the disable bit associated with the arriving data packet is equal to "1," step 308, the balance of the bits from the arriving data packet are entered into memory and its distance to the last resequenced data packet is compared to the "keep" threshold. The balance of the bits from the arriving data packet that are entered into memory, step 310, which may comprise the upper six bits of the sequence number of the arriving data packet. Finally, the arriving data packet is compared with the last resequenced packet, step 314, and the process terminates.

Figure 6:
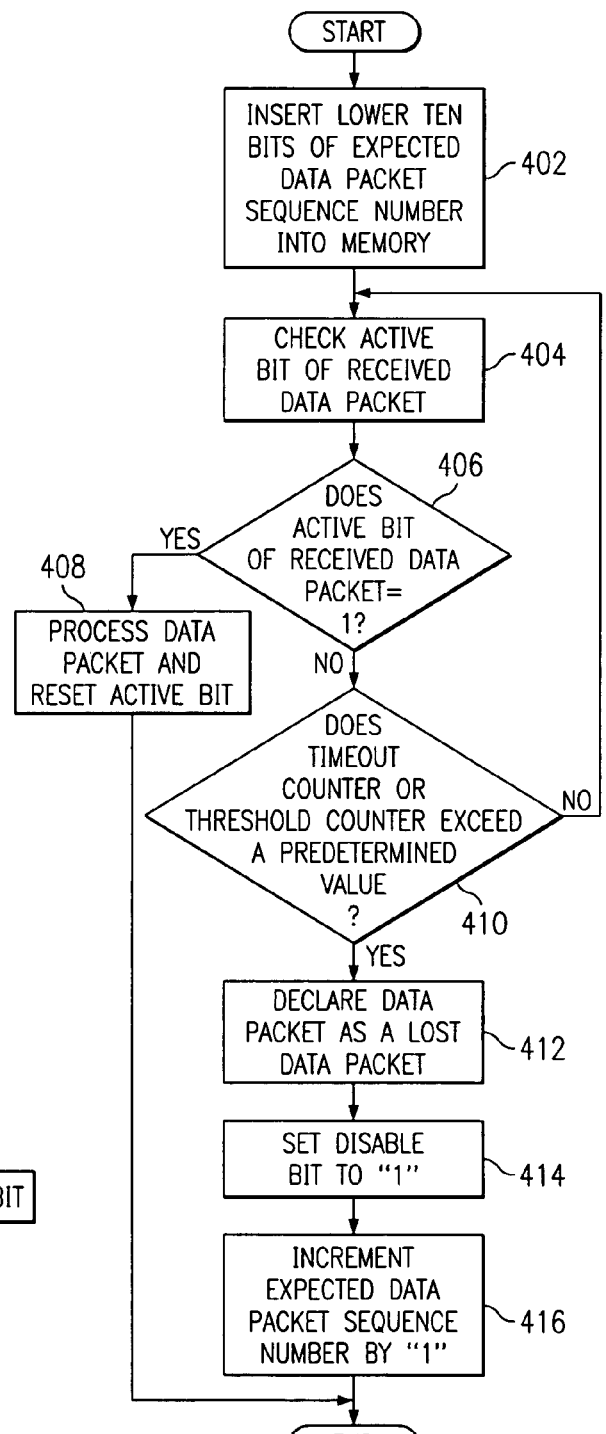
FIG. 6 is an exemplary process flow diagram illustrating the method of declaring lost data packets in accordance with one embodiment of the present invention.

FIG. 6 is an exemplary process flow diagram illustrating in detail the method of resequencing a received data packet in accordance with the present invention. In this example, the operation starts by using bits from the sequence number of the arrived data packet to index into memory, step 402. The bits from the sequence number of the received data packet may the lower ten bits of the sequence number. An active bit associated with the received data packet is then examined, step 404. A determination is then made as to whether or not the active bit of the received data packet equals "1," step 406. If the active bit of the received data packet does not equal "1," step 406, a determination is then made as to whether or not a timeout counter or a threshold counter has reached a predetermined value, step 410. If a timeout counter or a threshold counter has not reached a predetermined value, step 410, the operation returns to step 410 in which the determination is made as to whether or not a timeout counter or a threshold counter has reached a predetermined value. If a timeout counter or a threshold counter has reached a predetermined value, step 410, the received data packet is declared as a "lost" data packet, step 412.

Then a disable bit associated with the received data packet is set to "1," step 414. The next expected sequence number of an arriving data packet is then incremented by one (step 416) and thereafter the operation terminates. Returning to step 406, if the active bit associated with the received data packet does equal "1," step 406, the received data packet is processed and the active bit associated with the processed packet is reset (step 408) and thereafter the operation terminates.

Advantages realized by the invention include the ability to provide efficient and confident resequencing of data packets when memory is limited and when multiple paths are used to transmit the data packets from an origination terminal to a destination terminal. Those skilled in the art will recognize that reduction of retransmissions of "lost" data packets decrease congestion and lead to a more efficient use of the telecommunications network.

It should be understood that variations in the application of the invention are possible without departing from the inventive concepts. The information packets may be switch packets as in the above example, or the information may be in the form of voice packets. The data packet sequence number validations may be performed at regular intervals throughout the duration of a transmission, or in real-time. The invention may also be practiced individually with multiple adjacent links or over links spanning more than two adjacent nodes in a telecommunication network.

What is claimed is:

1. In a data transmission device having a finite amount of memory space, a method of handling data packets whose sequence number are out of order with respect to previously received data packets, the method comprising the steps of:
    following receipt of a data packet, determining if the sequence number of the received data packet is out of order in comparison to previously received data packets;
    if the sequence number is out of order, determining the distance between the out of order sequence number and the sequence number of the last data packet that was received in sequence; and
    using the distance to discard or keep the received data packet based on a predetermined amount of threshold level of distance, the threshold level of distance being a function of the finite amount of memory space of the data transmission device.

2. The method of claim 1 further comprising the step of marking the received data packet as already declared lost if the distance between the sequence number of the received data packet and the sequence number of the last data packet that was received in sequence is less than the threshold level of distance.

3. The method of claim 2 further comprising the step of discarding the received data packet.

4. The method of claim 1 further comprising the step of marking the received data packet as a rolled over data packet if the distance between the sequence number of the received data packet and the sequence number of the last data packet that was received in sequence is greater than the threshold level of distance.

5. The method of claim 4 further comprising the step of keeping the received data packet.

6. The method of claim 5 further comprising the step of resequencing the received data packet.

7. The method of claim 6 wherein the step of resequencing the received data packet further comprises the steps of:
indexing a portion of the sequence number associated with the received data packet into the memory space;
inspecting the active bit of a threshold counter to determine if it is inactive; and
waiting to receive the next data packet in sequence with the received data packet until the threshold counter expires.

8. The method of claim 7 further comprising the step of marking the received data packet as loss if the threshold counter expires and the next data packet in sequence is not received.

9. The method of claim 1 wherein the step of determining the distance further includes the steps of:
storing a first portion of bits from a sequence number associated with the received data packet;
subtracting the first portion of bits from the sequence number of the last data packet previously received that was successfully sequenced.

10. In a system for routing packet data, the system including an ingress side, an egress side, and switch fabric providing pathways between the ingress side and egress side, a method of handling data packets received at the egress of the system that appear to have been previously designated as lost, the method comprising the steps of:
the egress side of the system receiving an out of sequence data packet;
a resequencing engine of the system measuring the distance between the sequence number associated with the out of sequence data packet and the sequence number of the last packet that was received in sequence; and
the resequencing engine discarding or resequencing the received data packet based on a predetermined threshold level of distance, the threshold level of distance being a function of the amount of memory in the system that is available for resequencing data packets.

11. The method of claim 10 further comprising the step of the resequencing engine marking the received data packet as lost if the distance between the sequence number associated with the out of sequence data packet and the sequence number of the last packet that was received in sequence is less than the predetermined threshold level of distance.

12. The method of claim 11 further comprising the step of the resequencing engine discarding the received data packet.

13. The method of claim 10 further comprising the step of the resequencing engine storing the received data packet if the distance between the sequence number associated with the out of sequence data packet and the sequence number of the last packet that was received in sequence is greater than the predetermined threshold level of distance.

14. The method of claim 13 further comprising the step of resequencing the received data packet.

15. A data routing system for use in a data network that is capable of handling received data packets that appear to have been marked as previously discarded, the data routing comprising:
an ingress side for receiving incoming data packets from the data network;
an egress side for transmitting outgoing data packets unto the network;
switch fabric interspersed between the ingress side and the egress side for routing data packets received from the ingress board to a destination serviced by the egress side; and
a resequencing engine comprising:
a processor; and
logic instructions for causing said processor to measure the distance between the sequence number associated with the out of sequence data packet received by the egress side and the sequence number of the last packet that was received in sequence;
wherein the resequencing engine is further adapted to discard or resequence the received data packet based on a predetermined threshold level of distance, the threshold level of distance being a function of the amount of memory in the system that is available for resequencing data packets.

16. The system of claim 15 wherein said ingress side further comprises a plurality of ingress ports for receiving incoming data packets from the data network.

17. The system of claim 16 wherein said egress side further comprises egress ports for transmitting outgoing data packets to said data network.

18. The system of claim 16 further comprising memory space for storing out of sequence data packets received at said egress side.

19. The system of claim 18 wherein said logic is further adapted to cause said processor to determine if an incoming data packet if out of order in comparison to previously received data packets and, if so, for storing a first portion of bits from a sequence number associated with the received data packet in the memory space, and for resequencing the received data packet so that it is placed in an order according to sequence number.

20. The system of claim 19 wherein said logic is further adapted to cause said processor to compare a first portion of bits to a threshold value, the threshold value being a function of the distance between data packets previously received that were in sequence and an out of order data packet received by the egress side.

21. The system of claim 20 wherein said logic if further adapted to cause said processor to mark the received data packet as a rolled over data packet if the distance between the sequence number of the received data packet and the sequence number of the last data packet that was received in sequence is greater than the threshold level.

22. The system of claim 21 wherein said logic is further adapted to cause said processor to keep the received data packet.

23. The system of claim 22 wherein said logic is further adapted to cause said processor to resequence the received data packet.

* * * * *